United States Patent [19]

Toba et al.

[11] 3,936,524

[45] Feb. 3, 1976

[54] PROCESS FOR PREPARING POLYISOBUTYLENE OXIDE MOLDINGS OF EXCELLENT WORKABILITY

[75] Inventors: Hirotaka Toba; Keiichi Ohata; Nagayoshi Tsukane, all of Saitama, Japan

[73] Assignee: Daicel Ltd., Osaka, Japan

[22] Filed: Jan. 22, 1973

[21] Appl. No.: 325,924

[30] Foreign Application Priority Data
Jan. 27, 1972 Japan.............................. 47-10119

[52] U.S. Cl.............. 264/288; 260/2 A; 260/2 BP; 260/78.4 EP; 260/80 P
[51] Int. Cl.$^2$.................. C08G 65/04; C08G 65/30
[58] Field of Search ............ 260/2 A; 264/291, 288

[56] References Cited
UNITED STATES PATENTS

| | | | |
|---|---|---|---|
| 3,354,097 | 11/1967 | Vandenberg | 260/2 |
| 3,374,277 | 3/1968 | Vandenberg | 260/615 |
| 3,509,074 | 4/1970 | Kamio et al. | 260/2 |

*Primary Examiner*—Donald E. Czaja
*Assistant Examiner*—E. A. Nielsen
*Attorney, Agent, or Firm*—Woodhams, Blanchard and Flynn

[57] ABSTRACT

Polyisobutylene oxide polymer moldings containing 70 wt. % or more of isobutylene oxide, are prepared by heating the polymer to a temperature above 170°C and then quickly cooling the same by contacting it with a coolant to obtain crystalline resin having a diffraction peak at about $2\theta=12°$ in the X-ray diffraction pattern of the resin.

7 Claims, 1 Drawing Figure

PRIOR ART POLYMER

PROCESS FOR PREPARING POLYISOBUTYLENE OXIDE MOLDINGS OF EXCELLENT WORKABILITY

BACKGROUND OF THE INVENTION

1. Field of the Invention

This invention relates to a process for preparing polyisobutylene oxide moldings. More particularly, the invention relates to a process for preparing polyisobutylene oxide moldings which comprises the step of quickly cooling a heated or molten resin of polyisobutylene oxide to obtain crystalline resin different from that obtained by slow cooling, thereby facilitating the subsequent processing operations, such as stretching.

2. Description of the Prior Art

Although polyisobutylene oxides are highly crystalline polymers having excellent physical properties, the presently available films and thin sheets of polyisobutylene oxide do not have sufficient transparency or satisfactory mechanical properties.

It has been already known that remarkable improvements in strength, transparency, bending strength and impact strength are attained by subjecting polyisobutylene oxide moldings to a stretching treatment on heating or another heat treatment thereby stretching them to several or several tens times their original size and that the resulting films are practical (see the Official Gazette of Japanese Pat. Publication No. 12180/1965).

However, if the polyisobutylene oxide moldings are subjected to tensile drawing, particularly for the purpose of obtaining films, they must be heated to a temperature around their melting points (170°–175°C), because they are highly crystalline polymers. Consequently, even if there occurs only a small error in the temperature, partial fusion of the polymer can occur if the temperature is even slightly too high or the drawing operation per se can become very difficult if the temperature is even slightly too low due to insufficient softening, thereby causing breakage of the film during the drawing operation. Small errors or fluctuations in the temperature or the thickness of the sheet cause remarkable unevenness in the thickness of the stretched film. Thus, precisely controlled conditions are required for the production of the sheets on a commercial scale.

For facilitating the tensile stretching, a method can be considered in which heat rolls are used. However, this method is not suitable for obtaining a thin, transparent film on a commercial scale. The stretching property can be improved by means of copolymerization, blending or incorporation of an additive in the polyisobutylene oxide resin. However, these technical means are not preferred, because by these means, the physical properties of the resulting film are changed.

SUMMARY OF THE INVENTION

After intensive investigations for eliminating the defects of the conventional methods, the inventors have discovered that transparent polyisobutylene oxide moldings of excellent workability and having a crystalline property completely different from the properties of moldings obtained by slow cooling, can be obtained by heating moldings or film-forming polymers containing 70 wt. % or more of isobutylene oxide to a temperature above 170°C and then rapidly cooling them by contacting them with a coolant, such as a cooling roll, water or the like. There is obtained crystalline resin having a diffraction peak at about $2\theta=12°$ in the X-ray diffraction pattern. The heating temperature of the polymer may be selected appropriately within the range of from 170°C up to the decomposition temperature of the polymer. Usually, this decomposition temperature is at most 300°C. Specific polyisobutylene oxide polymers can have decomposition temperatures lower than 300°C. The maximum temperature during the heating step must be below the decomposition temperature of the specific polymer employed. The velocity of cooling is not particularly critical provided that the crystalline form of the final product is such that the above described particular diffraction peak is formed in its X-ray diffraction pattern.

DETAILED DESCRIPTION OF THE INVENTION

Essentially, crystalline high molecular weight molecules can take various crystalline forms and, therefore, they exhibit the same polymorphism as that of low molecular weight substances. For example, three crystalline modifications have been noted in guttapercha (1,4-trans-polyisoprene). Further, various modifications have been formed in protein, nylon and polypropylene (see, for example, Mandelkern: "Crystallization of High Molecules" translated by Akio Nakajima, Ryuzo Kitamaru and Fumimasa Hamada and published by Kagaku Dojin Co. also published by McGraw-Hill, 1964).

Figure 1:
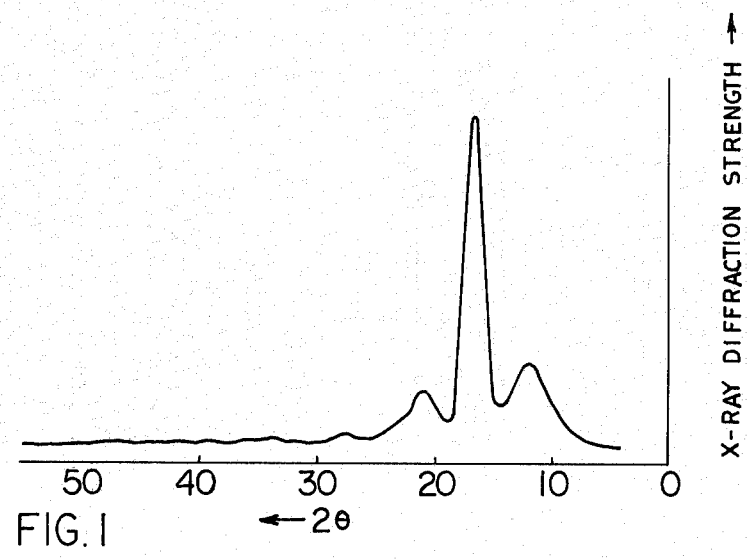
FIG. 1 is the X-ray diffraction pattern of a polymer obtained by the process of the present invention.
Figure 2:
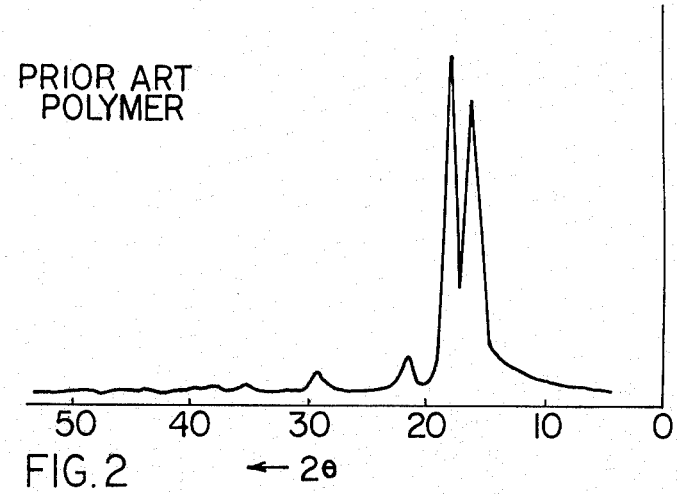
FIG. 2 is the X-ray diffraction pattern of a polymer obtained by a prior art process.

However, the crystalline modification of polyisobutylene oxide has never been reported. The inventors have succeeded in obtaining a polymer which affords an X-ray diffraction pattern (FIG. 1) which is completely different from the X-ray diffraction pattern of conventional polyisobutylene oxide crystal as shown in FIG. 2. This unique crystalline form of polyisobutylene oxide is obtained by the process of the present invention. In FIG. 1, X-ray diffraction peaks are noted at around 12°, 17° and 21°. These are clearly different from the peaks of the X-ray diffraction pattern of conventional polyisobutylene oxide as shown in FIG. 2. The crystalline forms of the two polymers affording different X-ray diffraction patterns as shown in FIGS. 1 and 2 are clearly different from each other. Particularly, the novel peak at around $2\theta=12°$ in FIG. 1 is unexpected in view of FIG. 2. It is technologically correct to verify the formation of a new crystalline form on the basis of the existence of this new peak at about 12°.

Moreover, the quick cooling step of the present invention is not a general procedure for obtaining crystalline modification of polymers. For example, a crystalline form of polypropylene different from that of commercial polypropylene has been obtained by crystallizing it from a melt or solution at a temperature of about 100°–130°C under atmospheric pressure or by crystallizing it under a high pressure. Thus, the unique effect of the process of the present invention cannot be predicted on the basis of conventional techniques.

It is apparent that polyisobutylene oxide is a highly crystalline polymer and that the physical properties thereof depend upon its crystalline property. The physical properties of polyisobutylene oxide are regulated by controlling its degree of crystallization by a known method. However, the finding of the present invention, i.e., that the crystalline form of polyisobutylene oxide is completely modified and that the unique crystalline modification is stable at room temperature for a long period, is noteworthy not only from a practical viewpoint but also from a scientific viewpoint.

As described above, the physical properties of polyisobutylene oxide depend on the high crystallinity thereof and, therefore, different crystalline forms have different physical properties. In the present invention, the resin obtained by quick cooling is different from that obtained by slow cooling and their actions are different from each other, almost as if they were completely different polymers. For example, the polyisobutylene oxide according to the invention has a high transparency that cannot be obtained in the conventional polyisobutylene oxide. In addition, it has been found that the tensile elongation of films prepared according to the process of the present invention is 200–400%, while the elongation of the conventional polyisobutylene oxide is 40–50%, both measured at room temperature.

A remarkable improvement is obtained also in the stretching property. In a stretching test carried out on 10 samples, surprisingly, the polymer prepared by the process of the present invention stretched easily in each test, while the polymer prepared by the conventional process was difficult to stretch, and cracks were formed in the film in 8 tests out of 10 tests, even though the tests were carried out by skilled workers. In this connection, it is to be noted that the film prepared by the process of the present invention has an excellent workability and the film can be stretched to 200–400% size even at room temperature.

In the process disclosed in the specification of Japanese Patent Publication No. 12180/1965, the stretching temperature is defined to be from 100° to 190°C.

If the sheet-shaped moldings obtained by the present invention are processed at room temperature and then heated to a temperature above 100°C for longer than 10 minutes, the crystalline form thereof becomes the same as that obtained by the slow cooling method and the products thus obtained are hard moldings having a small elongation. Alternatively, the moldings obtained by the present invention can be cold worked without destroying their unique crystalline form. The reason why the new crystalline modification is maintained in a stable state (i.e., metastable state) at temperatures below about 100°C is not known exactly and further investigations are necessary to elucidate this. Probably, however, the two methyl groups of the isobutylene oxide unit hinder the formation of the more stable configuration of the crystal thereby causing such a metastable state.

The polyisobutylene oxide used in the present invention should be, of course, a polymer which is able to form practical moldings or films. Generally, such a polymer has a reduced viscosity $\eta sp/c$ of higher than 0.8 inclusive, preferably, more than 1.0, which viscosity is determined by dissolving polyisobutylene oxide in o-dichlorobenzene at 110°C to obtain a solution having a concentration of 0.1 g/100 ml and measuring viscosity of the solution with an Ostwald's viscometer at 110°C.

The polyisobutylene oxides of the present invention are polymers including homopolymers and copolymers or blended polymer compositions, all containing more than 70 wt. % of isobutylene oxide units. As typical copolymerizable compounds, there can be mentioned, for example, oxygen-containing heterocyclic compounds such as ethylene oxide, propylene oxide, epichlorohydrin, allyl glycidyl ether, 3,3-bischloromethyl-cyclooxetane and trimethylene oxide and unsaturated double bond containing compounds such as phthalic anhydride, maleic anhydride, styrene and methylmethacrylate. As to the blended compositions, there may be mentioned those containing additives such as other polymers (blends), plasticizers and nucleating agent. Other compositions can also be used.

The moldings of the invention include general moldings obtained by injection, extrusion and/or compression molding, etc. such as sheets, films, fibers and various other resinous products.

The quick cooling employed in this invention employs a velocity of cooling which is effective for obtaining a peak at about $2\theta=12°$ in the X-ray diffraction pattern. The velocity is dependent on the particular composition treated and its physical shape and, thus, is not defined in concrete figures. Generally, this result can be attained by quickly cooling the molding at a rate higher than 10°C/sec., which rate is determined by contacting the heated polyisobutylene oxide polymer with a coolant such as a cooled roll or water, measuring the time required for lowering the temperature of the polymer to nearly that of the coolant from the starting high temperature (>170°C), using a thermoelectric thermometer, and calculating the value of total temperature drop/total cooling time.

Thus, for any specific molding made of any specific polyisobutylene oxide composition, test samples treated by the process of the invention using different cooling rates can be analyzed by X-ray diffraction to determine if the characteristic peak at $2\theta=12°$ appears. From these results, the specific cooling rate required to be used for commercial production of products to obtain the unique crystalline form of the invention can be readily determined by simple experimentation following the procedures described above. As stated previously, the critical test result indicating the presence of the unique crystalline form is the occurrence of the characteristic peak at about $2\theta=12°$ in the X-ray diffraction pattern.

According to the present invention, further working or shaping (such as rolling or cold forming) of polyisobutylene oxide at room temperature or higher temperature is facilitated by modifying the crystalline form of the polymer and, accordingly, the procedure of preparing practical molded articles on a commercial scale is improved highly. Thus, the process of the present invention has a high commercial value.

The process of the present invention will be further described with reference to the following illustrative Examples, which by no means limit the scope of the invention.

EXAMPLE 1

Polyisobutylene oxide of $\eta sp/c$ of 1.5 was melted at 190°C and a sheet of the molten polymer was poured into ice-water at 0°–3°C to cool the polymer quickly at a velocity of about 50°C/sec. The resulting sheet had a high transparency and it exhibited an X-ray diffraction pattern as shown in FIG. 1. The breaking stress and breaking elongation of the sheet at room temperature was 470 Kg/cm$^2$ and 264%, respectively.

On the other hand, a sheet obtained by heating the polymer at 190°C followed by cooling at a rate of 20°C/min. exhibited an X-ray diffraction as shown in FIG. 2. The breaking stress and breaking elongation of this sheet were 400 Kg/cm² and 42%, respectively.

EXAMPLE 2

A sheet of polyisobutylene oxide of $\eta sp/C$ of 2.3 was extruded at a temperature of 220°C and then was contacted with a roll cooled with water to 5°C positioned very close to the die to quickly cool the product at a rate of about 50°C/sec. The X-ray diffraction pattern of the thus formed semi-transparent sheet of 1.2 mm thickness was as shown in FIG. 1. By stretching this sheet biaxially at the same time to 6-fold size by using a biaxial stretching device at 80°C, a transparent, tough film was obtained. On the other hand, a sheet extruded by a conventional method at 220°C, showed cracks after 40–50% stretching at the same stretching temperature. In the latter case the cooling rate was 5°C/min.

EXAMPLE 3

Against the sheet of polyisobutylene oxide obtained in Example 2, there was pressed a mold of the shape of a fruit dish patterned with a flower at a pressure of about 5 Kg/cm² and the resin was heat-treated at 130°C for 30 minutes to obtain a hard plastic dish. The X-ray diffraction pattern of this dish was as shown in FIG. 2. This example demonstrates that molded products having an X-ray diffraction pattern as appearing in FIG. 1 can be molded and their crystalline structure can be modified so that the X-ray diffraction pattern becomes like that of FIG. 2.

The process of the present invention can be carried out both with previously formed moldings which are heated to a temperature over 170°C close to but below the melting point but also with polymers which are melted at a temperature over 170°C and then quickly cooled according to the invention.

The embodiments of the invention in which an exclusive property at privilege is claimed are defined as follows:

1. Isobutylene oxide polymer selected from the group consisting of homopolymers of isobutylene oxide and copolymers of isobutylene oxide and a copolymerizable cyclic ether or a copolymerizable compound containing an unsaturated carbon to carbon double bond, said copolymer containing at least 70 percent by weight of isobutylene oxide units said isobutylene oxide polymer having an x-ray diffraction pattern with a characteristic peak at $2\theta=$ about 12°, having an elongation at room temperature of from 200 to 400 percent and having a reduced specific viscosity of at least 1.0, said viscosity being determined by dissolving the isobutylene oxide polymer in o- dichlorobenzene in a concentration of 0.1 g/100 ml. and measuring the viscosity at 110°C.

2. Isobutylene oxide polymer as claimed in claim 1 having an X-ray diffraction pattern as appearing in FIG. 1 of the attached drawing.

3. A process for preparing isobutylene oxide polymer molding, which comprises heating a molding material to a temperature of over 170°C and below the decomposition temperature of the molding material, said molding material selected from the group consisting of homopolymers of isobutylene oxide and copolymers of isobutylene oxide and a copolymerizable cyclic ether or a copolymerizable compound containing an unsaturated carbon to carbon double bond, said copolymer containing at least 70 % by weight of isobutylene oxide units said molding material having a reduced viscosity $\eta sp/c$ of at least about 1.0, said viscosity being determined by dissolving the isobutylene oxide polymer in o-dichlorobenzene in a concentration of 0.1 g/100 ml and measuring the viscosity at 110°C;

then rapidly cooling the material at a rate effective to provide in the X-ray diffraction pattern of the material a characteristic peak at about $2\theta=12°$.

4. A process according to claim 3, in which the molding material is a homopolymer of isobutylene oxide, at or a copolymer containing at least 70 percent by weight of isobutylene oxide units and the balance is selected from the group consisting of ethylene oxide, propylene oxide, epichlorohydrin, allyl glycidyl ether, 3,3-bischloromethyl-cyclooxetane, trimethylene oxide, phthalic anhydride, maleic anhydride, styrene and methyl methacrylate.

5. A process according to claim 3, including the additional step of subjecting the isobutylen oxide polymer molding to a tensile drawing or stretching procedure.

6. A process according to claim 3, including the additional steps of altering the shape of the isobutylene oxide polymer molding and then heating the isobutylene oxide polymer molding to a temperature of at least about 100°C for a period of time effective to cause said characteristic peak in the X-ray diffraction pattern to disappear.

7. A process according to claim 3, in which the step of rapidly cooling the material comprises contacting the water with a cooled surface or cool fluid to reduce the temperature of the material from the starting temperature to substantially the temperature of the surface or fluid at a rate such that the value of total temperature drop/total cooling time is higher than 10°C/sec.

* * * * *